(12) United States Patent
Wu

(10) Patent No.: US 11,731,260 B1
(45) Date of Patent: Aug. 22, 2023

(54) MAGNETIC PICK-UP TOOL

(71) Applicant: Zhiwei Wu, Shenzhen (CN)

(72) Inventor: Zhiwei Wu, Shenzhen (CN)

( * ) Notice: Subject to any disclaimer, the term of this patent is extended or adjusted under 35 U.S.C. 154(b) by 0 days.

(21) Appl. No.: 18/095,706

(22) Filed: Jan. 11, 2023

(51) Int. Cl.
| | |
|---|---|
| *B25J 1/04* | (2006.01) |
| *B25J 18/02* | (2006.01) |
| *F21V 5/00* | (2018.01) |
| *F21V 33/00* | (2006.01) |
| *F21L 4/04* | (2006.01) |
| *B25B 11/00* | (2006.01) |

(52) U.S. Cl.
CPC .............. *B25J 1/04* (2013.01); *B25B 11/002* (2013.01); *B25J 18/025* (2013.01); *F21L 4/045* (2013.01); *F21V 5/008* (2013.01); *F21V 33/0084* (2013.01)

(58) Field of Classification Search
CPC ......... B25J 1/04; B25J 18/025; B25B 11/002; F21L 4/045; F21V 5/008; F21V 33/0084
See application file for complete search history.

(56) References Cited

U.S. PATENT DOCUMENTS

| | | | | |
|---|---|---|---|---|
| 3,582,638 A | * | 6/1971 | Peters | G02B 6/0006 362/582 |
| 5,381,319 A | * | 1/1995 | Shiao | B25B 11/002 362/120 |
| 5,647,623 A | * | 7/1997 | Shiao | B25J 1/04 362/120 |
| 5,716,121 A | * | 2/1998 | Dubois | F21L 15/08 362/208 |
| 6,312,138 B1 | * | 11/2001 | Coleman, Jr. | B25B 11/002 362/120 |
| 7,378,928 B2 | * | 5/2008 | Chang | H01F 7/0257 294/65.5 |
| 7,510,295 B2 | * | 3/2009 | Shih | F21L 4/045 362/198 |
| 8,746,918 B1 | * | 6/2014 | Rubino | F21V 21/28 359/223.1 |
| 2022/0105609 A1 | * | 4/2022 | Leal | B25H 3/06 |

* cited by examiner

*Primary Examiner* — Stephen A Vu
(74) *Attorney, Agent, or Firm* — Daniel M. Cohn; Howard M. Cohn

(57) ABSTRACT

A magnetic pick-up tool, including a handle, a magnetic attraction head, and a telescopic rod. The magnetic attraction head is disposed in front of the handle. A first magnet is disposed on the magnetic attraction head. A front end of the telescopic rod is connected to a rear end of the magnetic attraction head. A rear end of the telescopic rod is connected to the handle. An illuminating lamp device capable of emitting light forwards is disposed on the magnetic attraction head. The illuminating lamp device capable of emitting light forwards is disposed on the magnetic attraction head and may be turned on as required for achieving free switching of auxiliary illumination, which have a wider illumination range on sides in a dark environment, so that users may pick up objects well and convenience is brought to the users.

7 Claims, 5 Drawing Sheets

MAGNETIC PICK-UP TOOL

TECHNICAL FIELD

The present disclosure relates to a field of pick-up tools, and in particular to a magnetic pick-up tool.

BACKGROUND

In daily life, there are usually situations that iron-containing objects, such as coins and screws, fall under a sofa and a bed or fall behind a television cabinet. Once the iron-containing objects, especially small screws and the like, are lost, an entire device which the iron-containing objects work for is unable to normally work. Since places under the sofa and the bed or behind the television cabinet are narrow and small, which have corners and does not allow lights to enter, the fallen iron-containing objects are usually impossible to pick up. In addition, since sight line may be blocked at high positions, such as a wardrobe and a windowsill, it is also difficult to find and pick up the lost objects in such positions. At the same time, in industrial production, there are metal chips remained in holes having relatively small apertures after boring, tapping and other operations in a machining workshop, and the metal chips are unable to clean. After electrical equipment is operated for a long time, iron powders and other substances accumulated in narrow and small corners cannot be removed, and a long time of operation may lead to short circuit of the equipment. Moreover, during manual maintenance of other complex mechanical equipment, such as automobile maintenance, falling bolts, small tools, and instruments cannot be found or picked up by hand due to small space and many obstacles, and during maintenance, conditions in many deep holes, small holes, special-shaped holes, and slits cannot be seen clearly with ordinary flashlights.

However, current magnetic pick-up tools are generally provided with a single function, which may only magnetically pick up the objects and do not have lighting functions, so that users cannot pick up the objects well, which brings inconvenience to use.

SUMMARY

Based above and in view of the lack in the prior art, the present disclosure aims to provide a magnetic pick-up tool, which effectively solves a problem that current magnetic pick-up tools do not have an illumination function and is inconvenient to use.

In order to achieve above aims, the present disclosure provides following technical solutions.

The present disclosure provides a magnetic pick-up tool, including a handle, a magnetic attraction head, and a telescopic rod. The magnetic attraction head is disposed in front of the handle. A first magnet is disposed on the magnetic attraction head. A front end of the telescopic rod is connected to a rear end of the magnetic attraction head. A rear end of the telescopic rod is connected to the handle. An illuminating lamp device capable of emitting light forwards is disposed on the magnetic attraction head.

Optionally, the first magnet is annular, and the first magnet is disposed around a light outlet of the illuminating lamp device.

Optionally, the illuminating lamp device includes a lampshade, a lamp panel, a battery, and a control switch. The lampshade is disposed at a front end of the magnetic attraction head. The first magnet is disposed on a periphery of a front end of the lampshade. The lamp panel is disposed in the lampshade. The lamp panel and the battery are both disposed in the magnetic attraction head. The control switch is connected between the lamp panel and the battery. The control switch is exposed out of an outer surface of the magnetic attraction head.

Optionally, the lampshade is disposed in the front end of the magnetic attraction head, and the lampshade is capable of telescopically moving forwards and backwards.

Optionally, a second magnet is disposed on a tail end of the handle for magnetically fixing.

Optionally, the second magnet is of a disc-shaped structure.

Optionally, an accommodation cavity having an opening facing forwards is defined in the handle, and the accommodation cavity is configured to accommodate the telescopic rod.

Optionally, a hose capable of bending at any angle is disposed on a front end of the telescopic rod.

Optionally, a buckling sheet is fixed to an outer side surface of the handle for buckling.

Compared with the prior art, the present disclosure has obvious advantages and beneficial effects. Specifically, from the above technical solutions, there are advantages and beneficial effects as following.

The illuminating lamp device capable of emitting light forwards is disposed on the magnetic attraction head and may be turned on as required for achieving free switching of auxiliary illumination, which have a wider illumination range on sides in a dark environment, so that users may pick up objects well and convenience is brought to the users.

Figure 1:
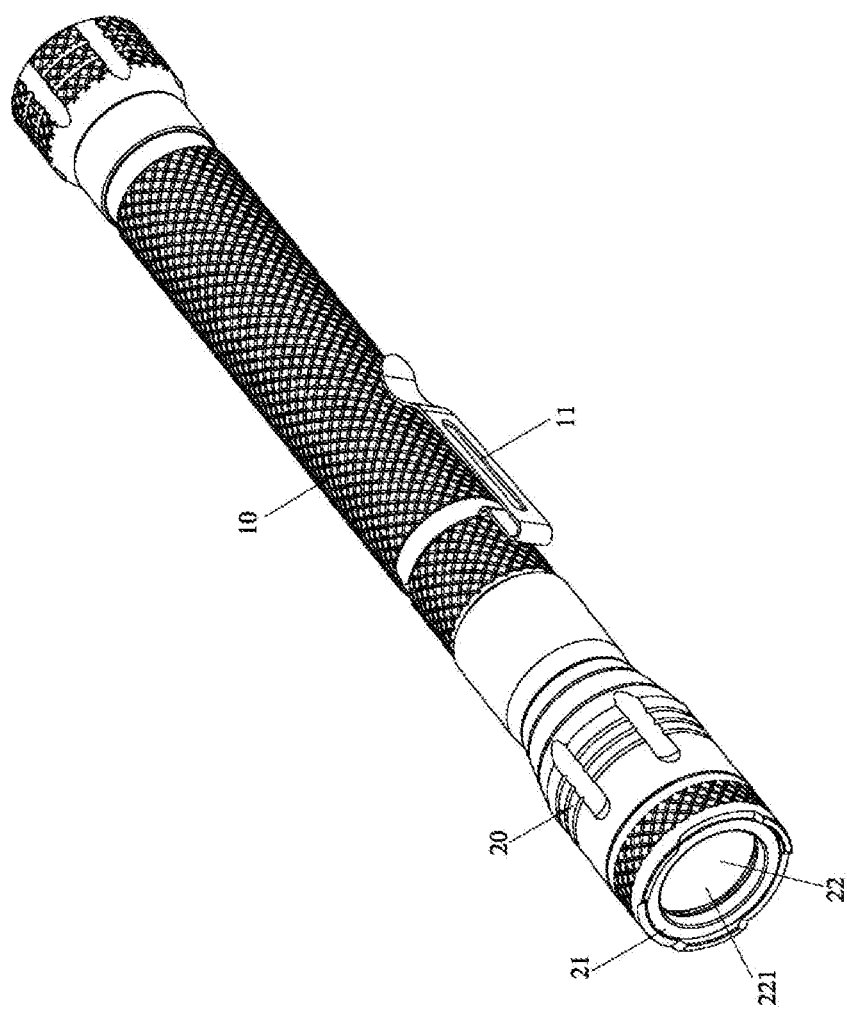
FIG. 1 is an assembled three-dimensional schematic diagram of a magnetic pick-up tool according to a preferred embodiment of the present disclosure.
Figure 2:
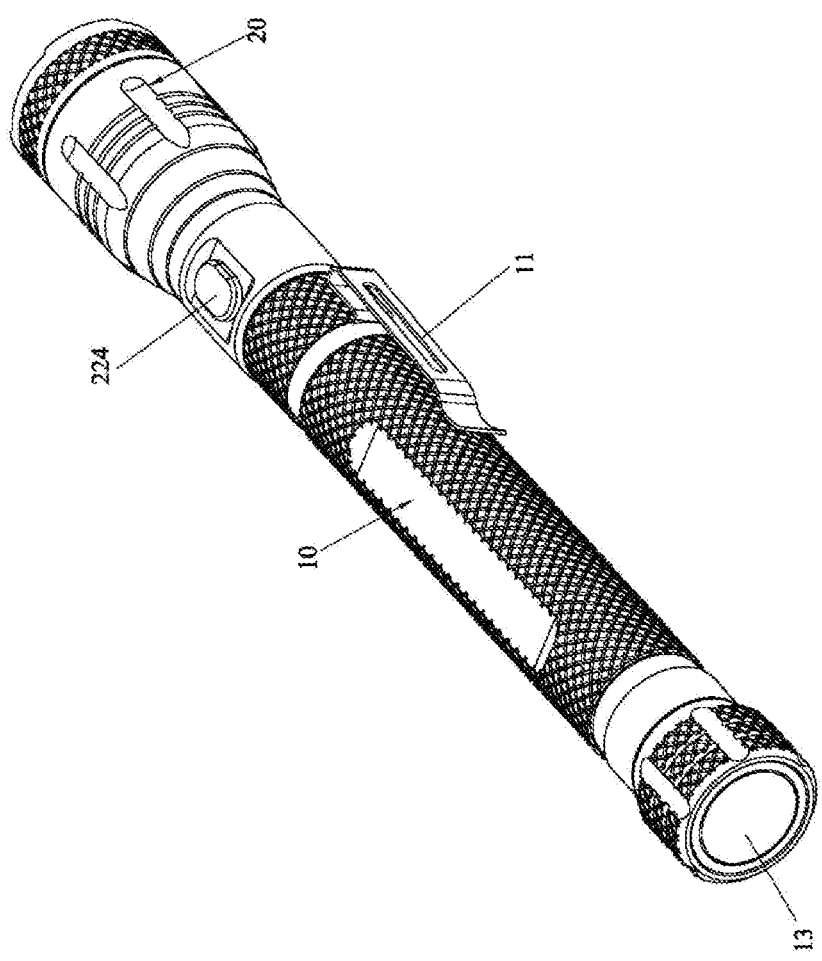
FIG. 2 is an assembled three-dimensional schematic diagram of the magnetic pick-up tool according to a preferred embodiment of the present disclosure at another angle.
Figure 3:
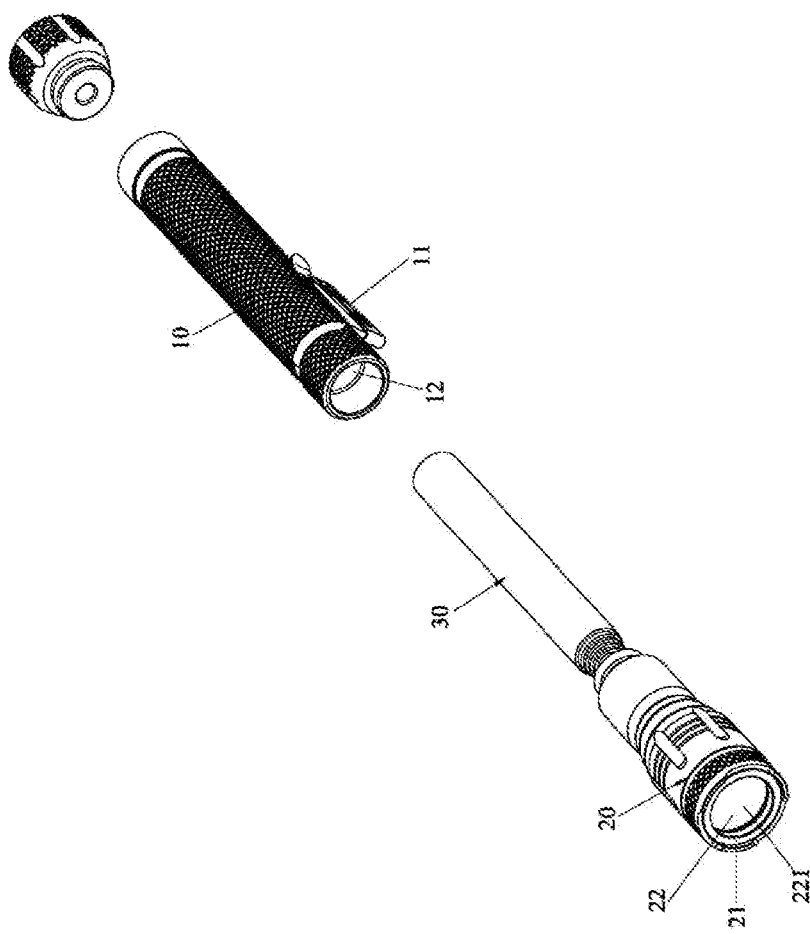
FIG. 3 is an exploded schematic diagram of the magnetic pick-up tool according to a preferred embodiment of the present disclosure.
Figure 4:
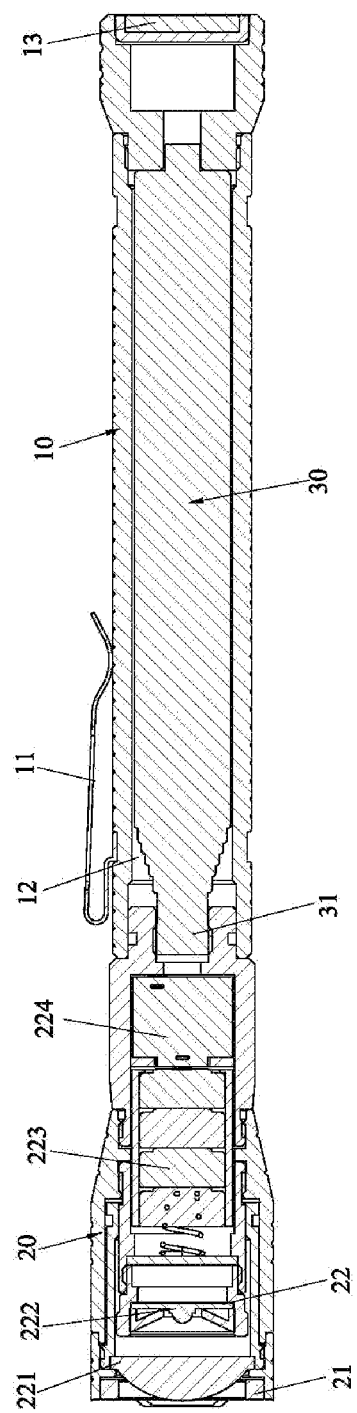
FIG. 4 is a cross-sectional schematic diagram of the magnetic pick-up tool according to a preferred embodiment of the present disclosure.

Reference number in the drawings: 10. handle; 11. buckling sheet; 12. accommodation cavity; 13. second magnet; 20. magnetic attraction head; 21. first magnet; 22. illuminating lamp device; 221. lampshade; 222. lamp panel; 223. battery; 224. control switch; 30. telescopic rod; 31. hose.

DETAILED DESCRIPTION

Referring to FIGS. 1-5, a specific structure of a preferred embodiment of the present disclosure is shown, including a handle 10, a magnetic attraction head 20, and a telescopic rod 30.

A buckling sheet 11 is fixed to an outer side surface of the handle 10, and the buckling sheet 11 for buckling. Anti-skid lines are formed on an outer surface of the handle 10 for better holding. An accommodation cavity 12 having an opening facing forwards is defined in the handle 10, and the accommodation cavity 12 is configured to accommodate the telescopic rod 30. A second magnet 13 is disposed on a tail end of the handle 10 for magnetically fixing with external objects. The second magnet 13 is a strong magnet, so that the second magnet 13 is well magnetically fixed with the external objects, which is beneficial for fixing and illuminating. The second magnet 13 is of a disc-shaped structure.

Figure 5:
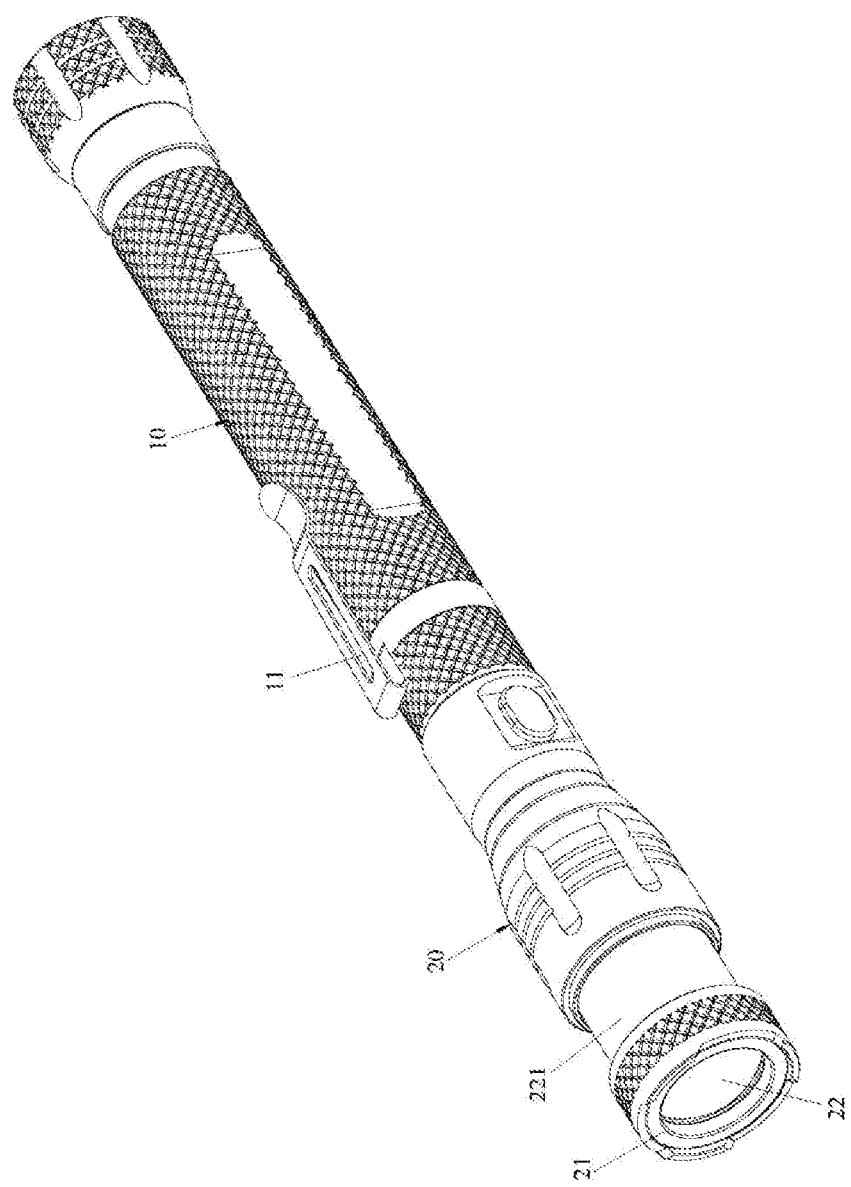
FIG. 5 is a perspective schematic diagram of a lampshade according to a preferred embodiment of the present disclosure where the lampshade moves forwards.

The magnetic attraction head 20 is disposed in front of the handle 10. A first magnet 21 is disposed on the magnetic attraction head 20. The first magnet 21 is a strong magnet, and the first magnet 21 well attracts small metal components. An illuminating lamp device 22 capable of emitting light forwards is disposed on the magnetic attraction head 20 and may be turned on as required for achieving free switching of auxiliary illumination, which have a wider illumination range on sides in a dark environment. In the embodiment, the first magnet 21 is annular, and the first magnet 21 is disposed around a light outlet of the illuminating lamp device 22. Specifically, the illuminating lamp device 22 includes a lampshade 221, a lamp panel 222, a battery 223, and a control switch 224. The lampshade 221 is disposed at a front end of the magnetic attraction head 20. The first magnet 21 is disposed on a periphery of a front end of the lampshade 221. The lamp panel 222 is disposed in the lampshade 221. The lamp panel 222 and the battery 223 are both disposed in the magnetic attraction head 22. The control switch 224 is connected between the lamp panel 222 and the battery 223. The control switch 224 is exposed out of an outer surface of the magnetic attraction head 22. Moreover, the lampshade 221 is disposed in the front end of the magnetic attraction head 22, and the lampshade 221 is capable of telescopically moving forwards and backwards. As shown in FIG. 5, when the lampshade 221 moves forwards and extends out of the magnetic attraction head 22, a wider illumination range is achieved.

A front end of the telescopic rod 30 is connected to a rear end of the magnetic attraction head 20. A rear end of the telescopic rod 30 is connected to the handle 10. In the embodiment, the telescopic rod 30 is accommodated in the accommodation cavity 12, and a hose 31 capable of bending at any angle is disposed on a front end of the telescopic rod 30, so that the magnetic attraction head 20 is bent at any angle with respect to the handle 10, which may adjust the magnetic attraction head 20 at any angle, and brings convenience for use.

A use method of the magnetic pick-up tool in the embodiment is as following.

During use, the magnetic attraction head 20 is pulled forward for extending the telescopic rod 30. When the telescopic rod 30 is pulled out to a sufficient length, the handle 10 is capable of holding by hand, the magnetic attraction head 20 is put into a narrow space, and the first magnet 21 is configured to magnetically attract for picking up the metal components. When the environment is relatively dark and needs to be illuminated, the illuminating lamp device 22 is turned on, which is beneficial for picking up the objects. When it is necessary to fix the illumination, the second magnet 13 is fixed with the external objects, and then the illuminating lamp device 22 is turned on, which is applicable for scenes such as vehicle maintenance.

A design key point of the present disclosure is that the illuminating lamp device capable of emitting light forwards is disposed on the magnetic attraction head and may be turned on as required for achieving free switching of auxiliary illumination, which have a wider illumination range on sides in a dark environment, so that users may pick up objects well and convenience is brought to the users.

A technical principle of the present disclosure is described above in combination with specific embodiments. Descriptions are merely intended to explain the principle of the present disclosure and cannot be interpreted in any way as a limitation to a protection scope of the present disclosure. Based on an explanation herein, a person skilled in the art would have been able to associate other specific embodiments of the present disclosure without involving an inventive effort, all of which fall within the protection scope of the present disclosure.

What is claimed is:

1. A magnetic pick-up tool, comprising:
   a handle;
   a magnetic attraction head; and
   a telescopic rod;
   wherein the magnetic attraction head is disposed in front of the handle, a first magnet is disposed on the magnetic attraction head; a front end of the telescopic rod is connected to a rear end of the magnetic attraction head, a rear end of the telescopic rod is connected to the handle, and an illuminating lamp device capable of emitting light forwards is disposed on the magnetic attraction head;
   wherein the first magnet is annular, and the first magnet is disposed around a light outlet of the illuminating lamp device;
   wherein the illuminating lamp device comprises a lampshade, a lamp panel, a battery, and a control switch; the lampshade is disposed at a front end of the magnetic attraction head, the first magnet is disposed on a periphery of a front end of the lampshade, the lamp panel is disposed in the lampshade, the lamp panel and the battery are both disposed in the magnetic attraction head, the control switch is connected between the lamp panel and the battery, and the control switch is exposed out of an outer surface of the magnetic attraction head.

2. The magnetic pick-up tool according to claim 1, wherein the lampshade is capable of telescopically moving forwards and backwards.

3. The magnetic pick-up tool according to claim 1, wherein a second magnet is disposed on a tail end of the handle for magnetically fixing.

4. The magnetic pick-up tool according to claim 3, wherein the second magnet is of a disc-shaped structure.

5. The magnetic pick-up tool according to claim 1, wherein an accommodation cavity having an opening facing forwards is defined in the handle, and the accommodation cavity is configured to accommodate the telescopic rod.

6. The magnetic pick-up tool according to claim 1, wherein a hose capable of bending at any angle is disposed on a front end of the telescopic rod.

7. The magnetic pick-up tool according to claim 1, wherein a buckling sheet is fixed to an outer side surface of the handle for buckling.

* * * * *